(12) United States Patent
Osogami et al.

(10) Patent No.: US 11,461,703 B2
(45) Date of Patent: Oct. 4, 2022

(54) DETERMINANTAL REINFORCED LEARNING IN ARTIFICIAL INTELLIGENCE

(71) Applicant: INTERNATIONAL BUSINESS MACHINES CORPORATION, Armonk, NY (US)

(72) Inventors: Takayuki Osogami, Yamato (JP); Rudy R. Harry Putra, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 781 days.

(21) Appl. No.: 16/255,219

(22) Filed: Jan. 23, 2019

(65) Prior Publication Data
US 2020/0234197 A1   Jul. 23, 2020

(51) Int. Cl.
*G06N 20/20* (2019.01)
*G06N 5/04* (2006.01)

(52) U.S. Cl.
CPC ............. *G06N 20/20* (2019.01); *G06N 5/043* (2013.01)

(58) Field of Classification Search
CPC ............................... G06N 20/20; G06N 5/043
See application file for complete search history.

(56) References Cited

U.S. PATENT DOCUMENTS

| | | |
|---|---|---|
| 9,569,736 B1 | 2/2017 | Ghesu et al. |
| 2017/0032245 A1 | 2/2017 | Osband et al. |
| 2018/0012137 A1 | 1/2018 | Wright et al. |

OTHER PUBLICATIONS

Osogami et al., Determinantal Reinforcement Learning, 33 AAAI Conference on Artificial Intelligence, Proceedings of the 33rd AAAI Conference on Artificial Intelligence, pp. 4659-4666, Jan. 2019. (Year: 2019).*
Yang et al., Multi-Agent Determinantal Q-Learning, Proceedings of the 37th International Conference on Machine Learning, Jun. 2020. (Year: 2020).*
Shalev-Shwartz et al., Safe Multi-Agent, Reinforcement Learning for Autonomous Driving, Oct. 2016. (Year: 2016).*
Rashid et al., QMIX: Monotonic Value Function Factorization for Deep Multi-Agent Reinforcement Learning, Proceedings of the 35th International Conference on Machine Learning, Jun. 2018. (Year: 2018).*
Gartrell et al., Low-Rank Factorization of Determinantal Point Processes, Proceedings of the 31st AAAI Conference on Artificial Intelligence, pp. 1912-1918, Feb. 2017. (Year: 2017).*
Chen et al., Factorized Q-Learning for Large-Scale Multi-Agent Systems, pp. 1-11, Sep. 2018. (Year: 2018).*

(Continued)

*Primary Examiner* — Kamran Afshar
*Assistant Examiner* — Marshall L Werner
(74) *Attorney, Agent, or Firm* — Tutunjian & Bitetto, P.C.; Randall Bluestone (57) ABSTRACT

Methods and systems for selecting and performing group actions include selecting parameters for an approximated action-value function, which determines a reward value associated with a particular group action taken from a particular state, using a determinant of a parameter matrix for the action-value function. A group action is selected using the approximated action-value function and the selected parameters. Agents are triggered to perform respective tasks in the group action.

18 Claims, 3 Drawing Sheets

(56) References Cited

OTHER PUBLICATIONS

Sim et al., Global A-Optimal Robot Exploration in Slam, IEEE International Conference on Robotics and Automation, Apr. 2005. (Year: 2005).*

Brian Sallans et al., "Using Free Energies to Represent Q-values in a Multiagent Reinforcement Learning Task", NIPS'00 Proceedings of the 13th International Conference on Neural Information Processing Systems, Jan. 2000.

Brian Sallans et al., "Reinforcement Learning with Factored States and Actions", Journal of Machine Learning Research 5, Aug. 2004.

Nicolas Heess et al., "Actor-Critic Reinforcement Learning with Energy-Based Policies", JMLR: Workshop and Conference Proceedings, Jul. 2012.

Osogami et al., "Dynamic determinantal point processes" Association for the Advancement of Artificial Intelligence (www.aaai.org), Apr. 2018.

Han Wang et al., "Exploring Multi-Action Relationship in Reinforcement Learning", PRICAI 2016: PRICAI 2016: Trends in Artificial Intelligence, Aug. 2016.

* cited by examiner

DETERMINANTAL REINFORCED LEARNING IN ARTIFICIAL INTELLIGENCE

BACKGROUND

Technical Field

The present invention generally relates to machine learning systems and, more particularly, to reinforcement learning that uses determinantal approximations to guide the actions of large numbers of agents.

Description of the Related Art

Reinforcement learning is based on action-value information, where actions are associated with the benefit or cost (relative to some appropriate metric) that results from taking the action when in a particular state. This can be represented as a function that takes the action and the state and outputs a corresponding reward. While an explicit description of the action-value function is possible, describing every possible reward for every possible combination of action and state, computing such a table of values can quickly become computationally intractable. An approximation can therefore be made, using approximation parameters selected for the particular application. However, when multiple agents are taking actions collaboratively, the combinatorial space defined by the possible actions grows very large, along with the number of parameters for the approximation.

SUMMARY

A method for selecting and performing group actions includes selecting parameters for an approximated action-value function, which determines a reward value associated with a particular group action taken from a particular state, using a determinant of a parameter matrix for the action-value function. A group action is selected using the approximated action-value function and the selected parameters. Agents are triggered to perform respective tasks in the group action.

A system for selecting and performing group actions includes a parameter update module comprising a processor configured to select parameters for an approximated action-value function, which determines a reward value associated with a particular group action taken from a particular state, using a determinant of a parameter matrix for the action-value function. A group action module is configured to select a group action using the approximated action-value function and the selected parameters and to trigger a plurality of agents to perform respective tasks in the group action.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use a matrix of parameters for an approximator of an action-value function for reinforcement learning. A determinant of the parameter matrix is used to approximate the action-value function, which helps capture diversity in team actions when multiple agents are being considered. The present embodiments can thereby deal with partial observability and train a time-series model in an end-to-end manner. The present embodiments substantially outperform reinforcement learning approaches that have previously been used to deal with a high dimensional action space.

The present embodiments address the problem of controlling multiple agents in a collaborative manner. For example, players of a team that want to learn from their experience of how to collaboratively play to win a game, or controlling multiple robots to accomplish a task that cannot be handled by a single robot, are scenarios where multiple independent agents make decisions in furtherance of a common goal. In some circumstances, it is important for agents to not only make decisions based on local information, but to select actions that are collectively diverse. For example, the players of a defensive team should guard relevant and diverse areas (zone defense) or relevant and diverse players of another team (one-on-one defense). Having each player independently select the most important zone or opposing player would result in most of the field being unguarded.

Even when the agents are centrally controlled, multi-agent reinforcement learning faces a challenge in the exponential growth of possible combinations of actions. The simple approach of handling the combinations of actions, as if they were the action of a hypothetical single agent (e.g., a team) does not scale as the number of agents increases.

The present embodiments therefore use the determinant of a matrix to approximate the action-value function in reinforcement learning, where the combination of relevant and diverse actions tends to have a high value. Each action is characterized by a feature vector that has a length that represents the relevance of that action at a state. The angle between two feature vectors represents the similarity between two actions at that state. A set of feature vectors thereby defines a parallelotope that has a squared volume given by the determinant of the Gram matrix of those feature vectors. The value of a combination of actions at a state is given by the logarithm of the determinant of a principal submatrix of a positive semidefinite matrix (kernel), where the principal submatrix is specified by the actions and the kernel depends on the state.

The present embodiments address partial observability by letting the kernel depend on the history of observations. The special case of a history-dependent diagonal kernel reduces to the representation of the action-value function with a time-series model, such as a recurrent neural network or vector autoregressive model. The present embodiments can therefore be represented as the addition of a differential determinantal layer to the output of a neural network.

In fully observable environments, such as blocker tasks, the present embodiments provide near-optimal results about ten times faster than baseline approaches. The present embodiments also find near-optimal results substantially faster than baseline approaches for partially observable environments, such as in stochastic policy tasks.

The present embodiments thereby provide improvements to a wide variety of automation tasks that involve multiple independent agents. In one example, robots may be used to monitor a large space, such as at a train station or sporting event. These robots may be equipped with, e.g., cameras and some mobility, making it possible for the robots to move to the most advantageous position to monitor events. Thus, in some embodiments, the robots can take the form of small, autonomous air vehicles that record and collect video information from designated locations. The present embodiments control the positions of such robots to provide coverage of not only those regions which are particularly high-value (e.g., the goal area of a sports field), but also to provide diverse coverage of many different areas, so that important information is not missed.

Figure 1:
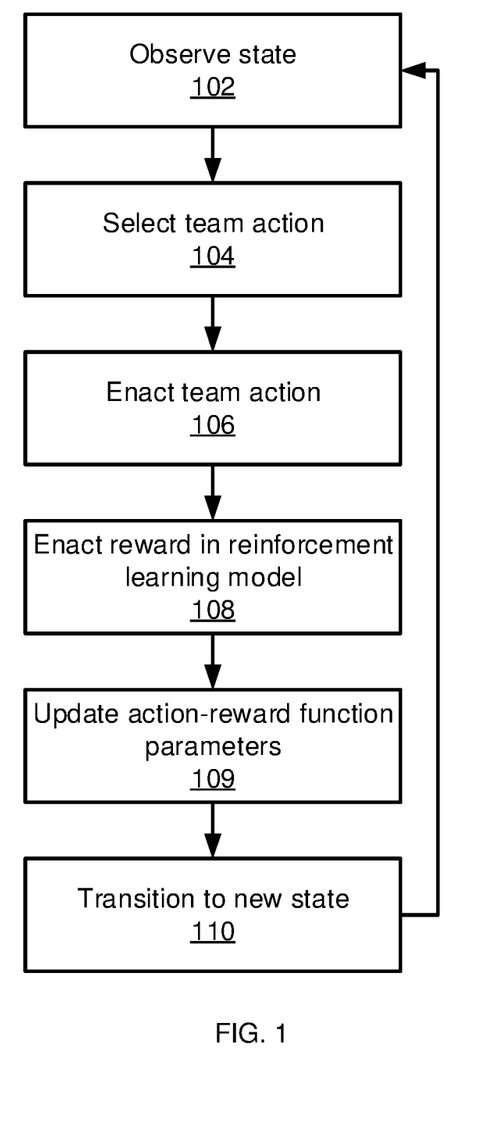
FIG. 1 is a block/flow diagram of a method for selecting group actions in a reinforced learning system based on a determinant of a parameter matrix in accordance with an embodiment of the present invention.

Referring now to the drawings in which like numerals represent the same or similar elements and initially to FIG. 1, a method for performing group actions with reinforcement learning is shown. Block 102 observes the state of the group. It is contemplated that the group may be formed of multiple independent physical agents, each able to perceive some or all of its environment, and each able to act independently of the other agents. Observing the state of the group may include, for example, collecting sensor information about the agents in the group themselves (e.g., their present configuration, location, actions, abilities, etc.) and collecting sensor information about the environment around the agents (e.g., conditions such as weather, temperature, ground condition, location, nearby obstacles, etc.).

Based on the current state of the group, block 104 selects a group action. The group action includes instructions for each respective member of the group and are selected to maintain both relevance toward a group goal and diversity, so that the group members do not all perform similar tasks. Block 106 then enacts the group action. In some circumstances, enacting the group action can include directly controlling the agents to cause them to perform their respective actions. In other embodiments, enacting the group action can include sending instructions to the respective team members to perform the actions. Block 108 enacts the reward in the reinforcement learning model, observing and recording the amount of the reward, which is used to update the parameters in block 109.

At this point, block 110 transitions to the next state that results from the performance of the group action. Processing returns to block 102 to capture any changes to the state that happened due changes in the environment or the presence of actors other than the agents. This process repeats until a goal is reached or some disruptive event occurs.

Figure 2:
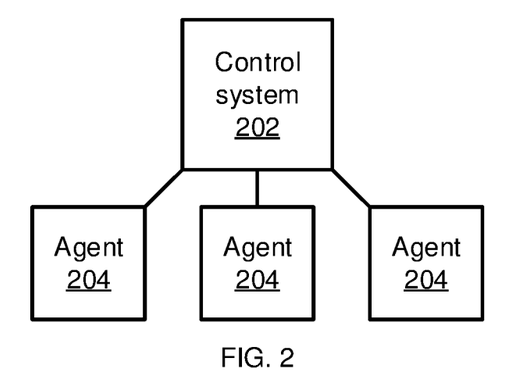
FIG. 2 is a block diagram illustrating a set of agents controlled by a central control system in accordance with an embodiment of the present invention.

Referring now to FIG. 2, a group control system is shown. Multiple distinct, independent agents 204 are in communication with a central control system 202. The control system 202 collects sensor information from each of the agents 204 to determine the present state of the group. Using this information, the control system 202 enacts the group action by causing the agents 204 to perform respective individual actions.

It should be understood that the agents 204 can be present in any number and can take any appropriate form. In some embodiments, the individual agents 204 represent Internet of Things devices that monitor and control an environment, such as in a smart home. In other embodiments, the agents 204 can represent individually mobile units, such as robots, that are working to achieve a task in the outside world such as, e.g., excavating a site, performing a construction task, mining ore, or demolishing a building. In still other embodiments, the agents 204 can represent virtual or software entities, for example in monitoring and responding to security threats in a computer network.

The present embodiments learn the action-value function Q(s, a), which represents the expected cumulative reward that can be obtained from a state s by taking the action a at s and then acting according to a policy under consideration. By learning Q(s, a), the present embodiments identify the action that is optimal at a given state when following the policy from the next state. This provides iterative improvements to the policy. In particular, the action-value function is iteratively updated according to:

$$Q(s_t, a_t) \leftarrow Q(s_t, a_t) + \eta \Delta_t$$

Where $\eta$ is a learning rate and $\Delta_t$ is a temporal difference error with a discount factor $\rho$ for $0 \leq \rho \leq 1$:

$$\Delta_t = r_{t+1} + \rho Q(s_{t+1}, a_{t+1}) - Q(s_t, a_t)$$

where $r_{t+1}$ is the reward at time t+1.

In many circumstances, it can be assumed that the Markovian state $s_t$ is observable. When the state is not observable, the present embodiments can let $s_t$ represent a feature vector of the history of observations by the time t.

When the action-value function is approximated with a function $Q_\theta$, using parameters $\theta$, the present embodiments can update $\theta$ according to:

$$\theta \leftarrow \theta + \eta \Delta_t \nabla_\theta Q_\theta(s_t, a_t)$$

where $\nabla_\theta$ is the gradient of the parameters.

The present embodiments use the determinant in $Q_\theta$. In particular, the term $x_t = \psi(a_t) \in \{0,1\}^N$ can be defined to be a binary representation of a group action $a_t$. For example, $x_t$ may indicate which subset of N possible actions is taken by the agent group. The term $z_t = \xi(a_{t-1}, r_t, o_t)$ represents the features of observation at time t, which can include the preceding group action $a_{t-1}$ and reward $r_t$ in addition to the partial observation $o_t$ of $s_t$. The term $z_{\leq t}$ denotes the observations made previous to, and including the time t. The action-value function can then be approximated as:

$$Q_\theta(z_{\leq t}, x_t) = \alpha + \log \det L_t(x_t)$$

where $L_t$ is a positive, semidefinite (and hence, symmetric) N×N matrix (kernel) which can vary over time t depending on $z_{\leq t}$, and where $L_t(x_t)$ is the principal submatrix of $L_t$ indexed by the elements that have the value 1 in $x_t$. In other words, $L_t(x_t)$ is obtained from L by removing rows and columns, where the $i^{th}$ row and column are removed if, and only if, the $i^{th}$ element of $x_t$ is 0 for any value of i. The term log det $L_t(0)=0$ is defined so that a determines the baseline value at $x_t=0$.

The present embodiments do not consider which actions should be assigned to which agents. When the agents are homogeneous, actions can be assigned arbitrarily once a subset is determined. For heterogeneous agents, the product space of the action spaces is considered and one action is selected form each action space.

The kernel matrix can be represented as:

$$L_t = VD_t V^T$$

where V is an arbitrary N×K matrix for 0<K≤N and $D_t$ is a diagonal matrix of order K with positive elements that can depend on $z_{\leq t}$. To ensure positivity:

$$D_t = \text{Diag}(\exp(d_t(\phi)))$$

for a K-dimensional vector $d_t(\phi)r$, where exponentiation is performed elementwise, and where Diag(·) denotes the diagonal matrix formed with a given vector. The term $d_t(\phi)$ can be considered as a time-series model, with a parameter $\phi$, that outputs a K-dimensional vector. The term $d_t(\phi)$ should also be differentiable with respect to $\phi$ to allow end-to-end learning. Examples of $d_t(\phi)$ include a recurrent neural network and a vector autoregressive model.

In the case where V is the identity matrix of order K=N, then:

$$\begin{aligned} \log \det L_t(x) &= \log \det D_t(x) \\ &= \log \prod_{i:(x)_i=1} \exp(d_t(\phi)_i) \\ &= d_t(\phi)^T x \end{aligned}$$

If the $i^{th}$ element of x indicates whether the $i^{th}$ action is taken by an agent, then the value of a group action is the sum of the values of individual actions, without consideration of diversity, where $d_t(\phi)$ represents the value (relevance) of individual actions at time t. With a non-identity V, the present embodiments can take diversity of actions into account.

The present embodiments learn all of the parameters $\theta \equiv (\alpha, V, \phi)$ in an end-to-end manner according to the parameter update described above, where the gradient $\nabla_\theta Q_\theta$ is provided for the action-value function for $Q_\theta(z_{\leq t}, x)$. Letting V(x) denote a matrix that has a subset of the rows of V indexed by x and letting $V(x)^+$ be the pseudo-inverse of V(x), and letting $\bar{x} \equiv 1-x$ elementwise, then:

$$\nabla_\alpha Q_\theta(z_{\leq t}, x) = 1$$

$$\nabla_{V(\bar{x})} Q_\theta(z_{\leq t}, x) = 0$$

$$\nabla_{V(x)} Q_\theta(z_{\leq t}, x) = 2(V(x)^+)^T$$

$$\nabla_\phi Q_\theta(z_{\leq t}, x) = \text{diag}(V(x)^+ V(x)) \nabla_\phi d_t(t)$$

where diag(·) is the vector formed with the diagonal elements of an input matrix.

Using this framework, block 102 observes the state $o_{t+1}$ for the current state (having just taken some action $a_t$). Block 104 then selects a team action $a_{t+1}$. Before block 110 transitions to the new state, block 109 updates the action-reward function parameters $\theta$.

To perform the update, block 109 first determines the matrices $D_t$ and $D_{t+1}$ as described above, with $d_t(\phi)$ being updated to $d_{t+1}(\phi)$ using the input of $z_t$. Block 109 then uses these matrices to compute the error $\Delta_t$ with the steps:

$$Q_t \leftarrow \alpha + \log \det V(x_t) D_t V(x_t)$$

$$Q_{t+1} \leftarrow \alpha + \log \det V(x_{t+1}) D_{t+1} V(x_{t+1})$$

$$\Delta_t \leftarrow r_{t+1} + \rho Q_{t+1} - Q_t$$

Using the error $\Delta_t$, the parameters $\theta \equiv (\alpha, V, \phi)$ are updated as:

$$\alpha \leftarrow \alpha + \eta \Delta_t$$

$$V(\bar{x}_t) \leftarrow V(\bar{x}_t) + 2\eta \Delta_t (V(x_t)^+)^T$$

$$\phi \leftarrow \phi + \eta \Delta_t \text{diag}(V(x_t)^+ V(x_t)) \nabla_\phi d_t(\phi)$$

The gradient $\nabla_\phi d_t(\phi)$) depends on the particular time-series model under consideration.

In practice, V can be expressed as V=I+A, where I is the identity matrix and A is learned with L2 regularization, such that the Frobenius norm of A tends to be small. This helps avoid overfitting to limited training data without loss of generality, because A is arbitrary.

When blocks 104 and 106 take a group action, a balance is needed in the tradeoff between actions that maximize relevance and actions that maximize diversity. It is specifically contemplated that Boltzmann exploration can be used to strike this balance, as the structure of the log-determinant allows Boltzmann exploration to run efficiently, but it should be understood that other approaches, such as E-greedy methods can be used instead.

In Boltzmann exploration, a group action a, having feature $x = \phi(a)$ is selected at a time t with probability:

$$\begin{aligned} \pi(x \mid z_{\leq t}) &= \frac{\exp(\beta Q_\theta(z_{\leq t}, x))}{\sum_{\tilde{x}} \exp(\beta Q_\theta(z_{\leq t}, \tilde{x}))} \\ &= \frac{\det(L_t(x)^\beta)}{\sum_{\tilde{x}} \det(L_t(\tilde{x})^\beta)} \end{aligned}$$

where $\beta$ is a parameter and where the summation with respect to $\tilde{x}$ is over the binary feature vectors that correspond to all of the possible group actions. When $\beta$ is small (close to zero), all of the group actions have approximately the same probability of being selected. A small $\beta$ allows exploration of selecting actions that do not necessarily have high estimated value. Such exploration improves the quality of the estimation of the values of the selected actions. When $\beta$ is large, group actions are selected with probabilities that are proportional to their estimated values. A large $\beta$ allows emphasis of actions that have high estimated value. A balance is needed between exploration of the solution space and selection of high value. The present embodiments may start with a small value of $\beta$ and gradually increase the value of $\beta$ as the values of the group actions are more reliably estimated. In this manner, the value of the outcome is maximized, while maintaining diversity.

When $\beta=1$ and the summation with respect to $\tilde{x}$ is over all of the possible $2^N$ binary vectors, then the above probability is reduced to a determinantal point process (DPP), providing efficient sampling. The low rank structure can be used to achieve further efficiency. Also, when the size of the subset is restricted to a given constant k, where each action in the subset corresponds to the action of one of the k agents making up the group, then the above probability is reduced to a k-DPP.

In the case of $\beta \neq 1$, samples can be drawn via Markov chain Monte Carlo methods by starting with a random binary vector x and choosing a candidate vector x' to replace it, with acceptance probability min $$\left\{ 1, \left( \frac{\det L_t(x')}{\det L_t(x)} \right)^\beta \right\}.$$

When each x corresponds to a candidate group action $a = \phi^{-1}(x)$, the Markov chain Monte Carlo method can be accelerated for the DPP. In this case, the candidate vector x' can be selected such that it differs from x by only one bit, which can be sampled uniformly at random from {1, . . . , N}. Then L(x) and L(x)' differ by only one rank and the ratio of their determinants can be computed efficiently using the Schur determinant identity and rank-one update methods. The only difference from the case of the DPP is that the ratio of the determinant is powered to β in the acceptance probability.

In practice, more exploratory approaches than the DPP can be used by mixing the DPP (β=1) and the uniform distribution (β→0) with suitable probabilities. On the other hand, approaches that focus more on relevance can be used by sampling from the DPP an appropriate number of times and selecting the sample having the highest value. In some embodiments, the Markov chain Monte Carlo approach is used to sample with Boltzmann exploration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
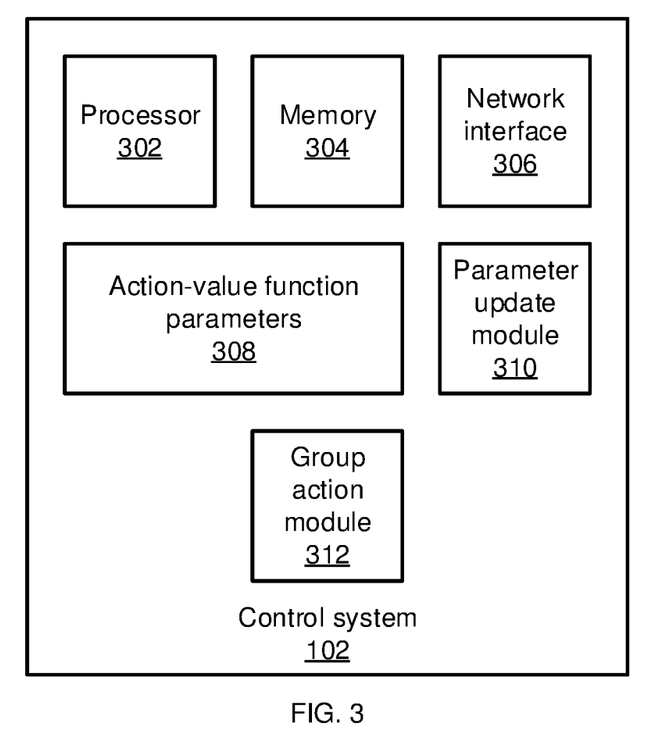
FIG. 3 is a block diagram of a central control system that selects group actions in a reinforced learning system based on a determinant of a parameter matrix in accordance with an embodiment of the present invention.

Referring now to FIG. 3, additional detail on the control system 102 is shown. The control system 102 includes a hardware processor 302 and memory 304. A network interface 306 provides communications between the control system 102 and the agents 104. In some embodiments, the network interface 306 receives sensor information that has been collected by the agents 104 to make an observation of the state of the agents 104. The control system 102 further includes one or more functional modules that may, in some embodiments, be implemented as software that is stored in the memory 304 and that is executed by the processor 302. In other embodiments, one or more of the functional modules can be implemented as one or more discrete hardware components in the form of an application-specific integrated chip or field programmable gate array.

A set of action-value function parameters 308 are stored in the memory 304. As actions are taken and rewards are applied, parameter update module 310 updates the parameters using a determinant process as described above. A group action module 312 uses the action-value function with the updated parameters at each iteration to determine a next group action, which is communicated using the network interface 306 to the agents 104.

Figure 4:
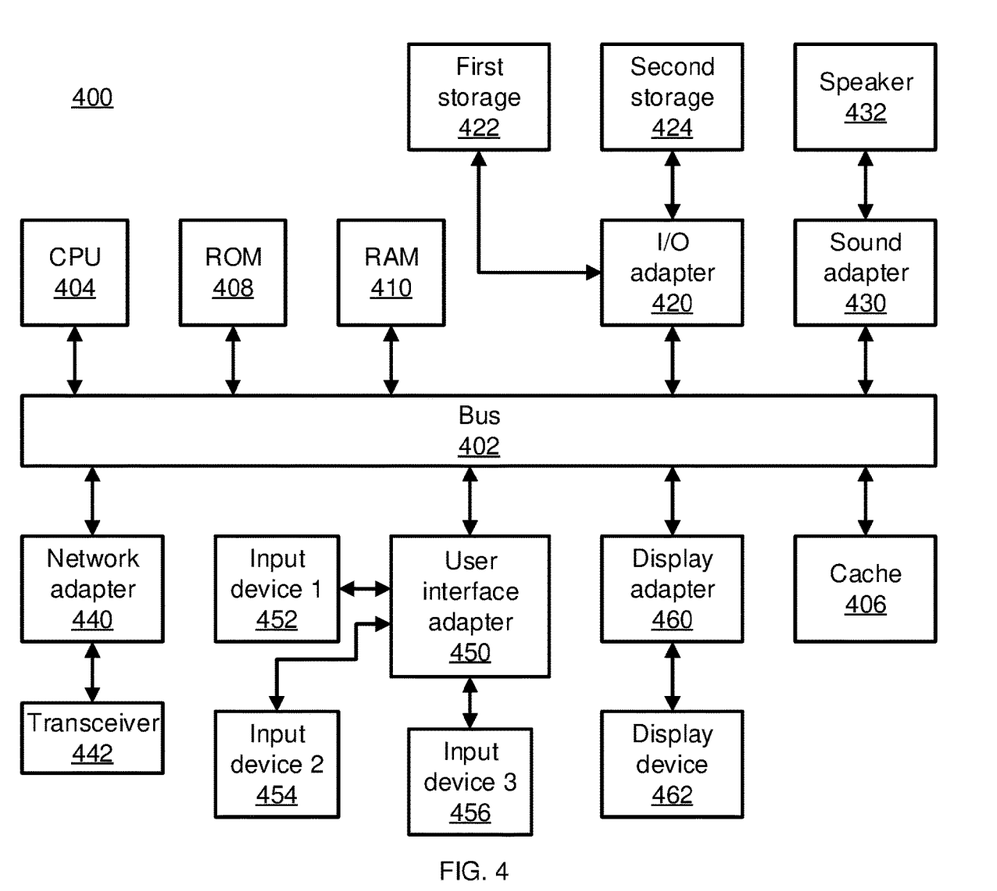
FIG. 4 is a block diagram of a processing system in accordance with an embodiment of the present invention.

Referring now to FIG. 4, an exemplary processing system 400 is shown which may represent the transmitting device 100 or the receiving device 120. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Having described preferred embodiments of determinantal reinforced learning in artificial intelligence (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for selecting and performing group actions, comprising:
   selecting parameters for a time-varying approximated action-value function, which determines a reward value associated with a particular group action taken from a particular state using a determinant of a time-varying parameter matrix for the action-value function;
   selecting a group action using the approximated action-value function and the selected parameters; and
   triggering a plurality of autonomous mobile devices to change positions in accordance with the group action.

2. The computer-implemented method of claim 1, wherein selecting the group action selects actions for individual autonomous mobile devices from the plurality of autonomous mobile devices.

3. The computer-implemented method of claim 2, wherein selecting the group action selects the actions for individual autonomous mobile devices to preserve diversity in the selected actions.

4. The computer-implemented method of claim 1, further comprising observing a present state of the plurality of autonomous mobile devices.

5. The computer-implemented method of claim 4, wherein the present state is completely observable.

6. The computer-implemented method of claim 4, wherein the present state is only partially observable.

7. The computer-implemented method of claim 6, wherein observing the present state includes considering previous partial observations of the state.

8. The computer-implemented method of claim 1, wherein each of the plurality of autonomous mobile devices is equipped with one or more sensors.

9. The computer-implemented method of claim 1, wherein selecting the group action approximates the action-value function with parameters θ as:

$$Q_\theta(z_{\leq t}, x_t) \equiv \alpha + \log \det L_t(x_t)$$

where $L_t$ is a positive, semidefinite N×N matrix which can vary over time t depending on $z_{\leq t}$, where $L_t(x_t)$ is the principal submatrix of $L_t$ indexed by the elements that have the value 1 in $x_t$, where $z_{\leq t}$ denotes the observations made previous to, and including the time t, where $x_t$ is an index vector at time t, where α is a baseline value at $x_t=0$, where log(·) is a base-10 logarithm, and where det(·) is a determinant function.

10. A non-transitory computer readable storage medium comprising a computer readable program for selecting and performing group actions, wherein the computer readable program when executed on a computer causes the computer to perform the steps of:
selecting parameters for a time-varying approximated action-value function, which determines a reward value associated with a particular group action taken from a particular state using a determinant of a time-varying parameter matrix for the action-value function;
selecting a group action using the approximated action-value function and the selected parameters; and
triggering a plurality of autonomous mobile devices to change positions in accordance with the group action.

11. A system for selecting and performing group actions, comprising:
a hardware processor; and
a memory that stores a computer program, which, when executed by the hardware processor, causes the hardware processor to:
select parameters for a time-varying approximated action-value function, which determines a reward value associated with a particular group action taken from a particular state using a determinant of a time-varying parameter matrix for the action-value function;
select a group action using the approximated action-value function and the selected parameters; and
trigger a plurality of autonomous mobile devices to change position in accordance with the group action.

12. The system of claim 11, wherein the computer program further causes the hardware processor to select actions for individual autonomous mobile devices from the plurality of autonomous mobile devices.

13. The system of claim 12, wherein the computer program further causes the hardware processor to select the actions for individual autonomous mobile devices to preserve diversity in the selected actions.

14. The system of claim 11, further comprising a network interface configured to receive information reflecting observations of a present state of the plurality of autonomous mobile devices.

15. The system of claim 14, wherein the present state is completely observable.

16. The system of claim 14, wherein the present state is only partially observable.

17. The system of claim 11, wherein each of the plurality of autonomous mobile devices is equipped with one or more sensors.

18. The system of claim 11, wherein selecting the group action approximates the action-value function with parameters θ as:

$$Q_\theta(z_{\leq t}, x_t) \equiv \alpha + \log \det L_t(x_t)$$

where $L_t$ is a positive, semidefinite N×N matrix which can vary over time t depending on $z_{\leq t}$, where $L_t(x_t)$ is the principal submatrix of $L_t$ indexed by the elements that have the value 1 in $x_t$, where $z_{\leq t}$ denotes the observations made previous to, and including the time t, where $x_t$ is an index vector at time t, where α is a baseline value at $x_t=0$, where log(·) is a base-10 logarithm, and where det(·) is a determinant function.

* * * * *